May 3, 1938.  G. G. MORSE  2,115,997
IMPELLER AND LINING CONSTRUCTION
Filed Nov. 19, 1935    3 Sheets-Sheet 1

INVENTOR.
GEORGE G. MORSE
BY
ATTORNEY.

May 3, 1938. G. G. MORSE 2,115,997
IMPELLER AND LINING CONSTRUCTION
Filed Nov. 19, 1935 3 Sheets-Sheet 2
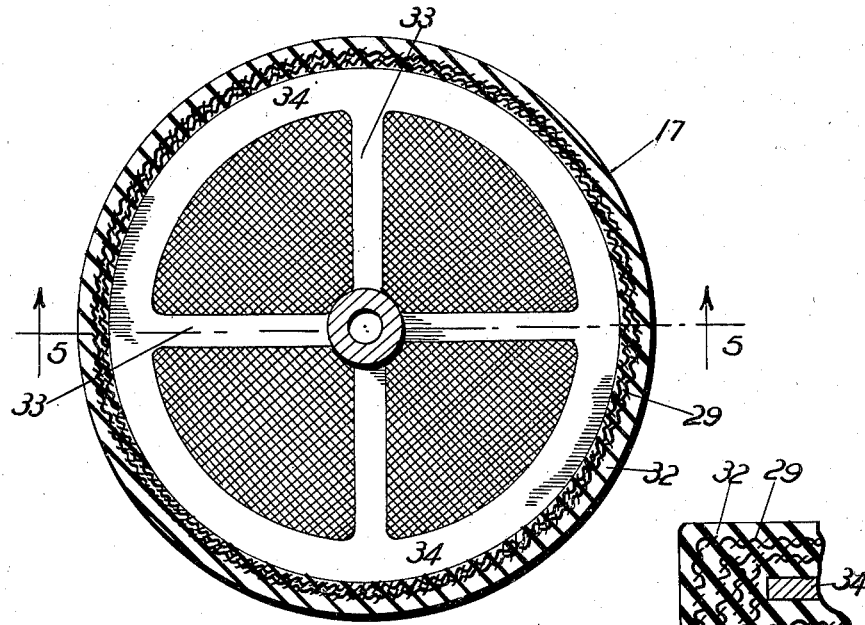
Fig. 4.
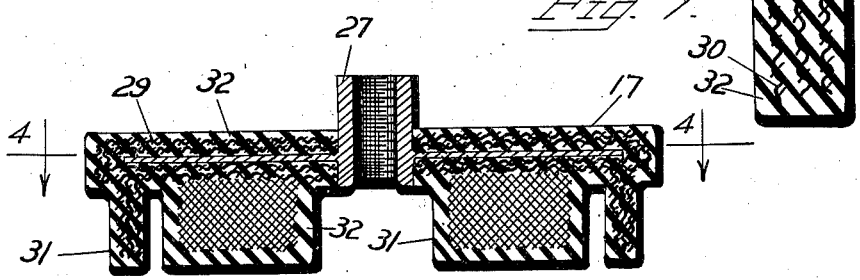
Fig. 5.
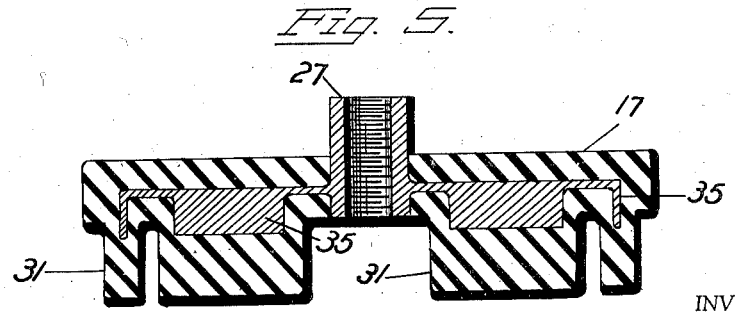
Fig. 6.
Fig. 7.
INVENTOR.
GEORGE G. MORSE
BY
ATTORNEY.

May 3, 1938.   G. G. MORSE   2,115,997
IMPELLER AND LINING CONSTRUCTION
Filed Nov. 19, 1935   3 Sheets-Sheet 3

INVENTOR.
GEORGE G. MORSE
BY
ATTORNEY.

Patented May 3, 1938

2,115,997

UNITED STATES PATENT OFFICE 2,115,997

IMPELLER AND LINING CONSTRUCTION

George G. Morse, Denver, Colo., assignor to Morse Bros. Machinery Company, Denver, Colo., a corporation of Colorado Application November 19, 1935, Serial No. 50,549

3 Claims. (Cl. 259—129)

This invention relates to rubberized linings for wear-surfaces of apparatus subjected to the action of gritty pulps and the like in the treatment of ores and the like, and relates more particularly to rubberized linings for froth flotation tanks and to rubber impeller construction.

It has long been known in the art of ore treatment that rubber linings are effective in resisting erosion and corrosion encountered in the treatment of gritty pulps. The patent to Sherwood, No. 1,381,673 of June 14, 1921 discloses the use of rubber linings for impellers and cell linings.

Present practice involves the application of a soft rubber lining to a non-resilient backing, such as a metal impeller element, or the bottom and walls of a flotation tank, by vulcanizing or cementing in place.

Difficulties have been encountered in practice due to the fact that the soft rubber does not adhere to the metallic backing, and the unyielding character of the backing causes the lining to be subjected to rapid deterioration from contact with the abrasive particles in the pulp on the surfaces subjected to the greatest wear.

As a result, the lining is soon cut, and once the particles have penetrated to the metallic backing, the rubber lining peels and replacement is necessary. This peeling frequently occurs before the major portion of the lining has commenced to show any appreciable wear, and as a consequence, such linings are expensive, due to their short life, while frequent and costly shutdowns are required to permit replacement.

It is an object of the present invention to provide a rubber lining for wear-surfaces of ore treating apparatus and the like, which comprises a resilient or yielding backing, and a soft rubber wear-resisting surface in integral connection therewith.

Another object of the invention is the provision of an impeller-element for use in gritty pulps having a core of resilient material, such as rubberized fabric, and an outer surface of corrosion and erosion resisting material, such as soft rubber.

A further object of the invention is to provide a wear resisting element composed of materials of different degrees of elasticity which will not become separated during use and excessive wear, and which may be readily formed into any desired shapes.

Still another object of the invention is the provision of an impeller-element for use in gritty pulps, which, in entirety, is sufficiently yieldable to prevent its wear-surfaces being subjected to the usual deterioration from erosion.

A still further object of the invention is to provide a novel construction for wear-surfaces which will permit use of corrosive-resisting materials not heretofore employed in the art.

Other objects reside in novel details of construction, and novel combinations and arrangements of parts as will more fully appear in the course of the following description.

Referring now to the drawings in the several views of which like parts have been similarly designated, and in which Figure 1 is a plan view of the bottom of an impeller-element embodying the present invention;

Figure 4 is a transverse section of a modified form of impeller-element, embodying the invention;

Figure 5 is a section taken along the line 5—5, Figure 4;

Figure 6 is a vertical section of another modified form of impeller-element, embodying the present invention;

Figure 7 is a fragmentary vertical section of the impeller element shown in Figures 4 and 5;

Figure 8:
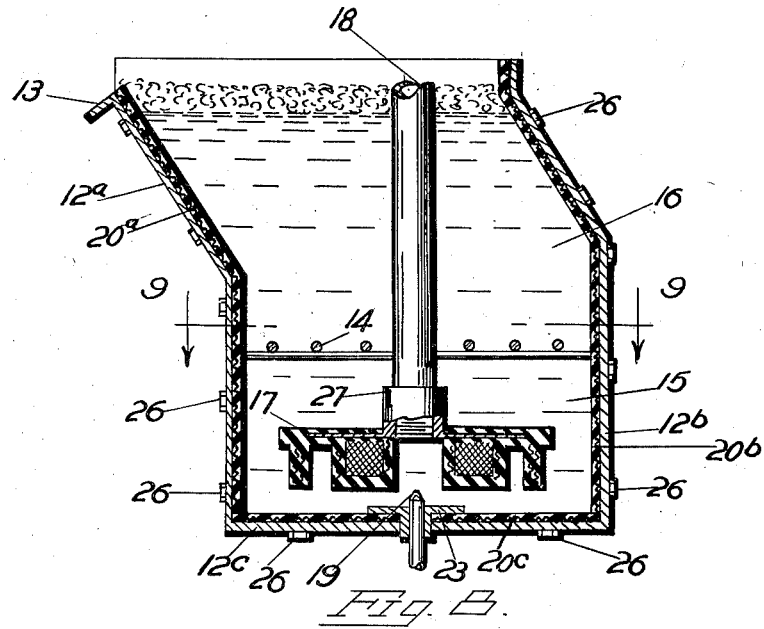
Figure 8 is a transverse section of one cell of a flotation machine provided with cell-linings and an impeller embodying the present invention.

Referring first to Figure 8, the invention is illustrated in its application to one cell of a froth flotation machine. The cell consists of upright walls 12 in rectangular arrangement, the front wall 12a of which is inclined forwardly in its upper portion and terminates in a froth overflow lip 13. The rear wall 12b is also forwardly inclined in its upper portion, the inclined portion thereof acting as a froth crowder.

The cell is divided, by a grid 14 extending across the same, into a lower agitation chamber 15 and an upper quiescent separating chamber 16.

An impeller 17 mounted for rotation on a shaft 18 is disposed in the agitation chamber 15 for producing an intimate intermixture of air and a conditioned pulp, whereby values in the pulp will be carried to the surface in finely dispersed air bubbles and collected in a froth for their subsequent removal across the lip 13 by overflow.

Two methods of supplying the necessary air for aerating the pulp have been illustrated in Figure 8. The shaft 18 may be of tubular construction, extending above the liquid level in the cell. Air is drawn downwardly through the shaft by the pumping action of the impeller, and if desired, pulp and/or reagent may be introduced into the upper open end of the same.

A jet 19 connected with a suitable source of air under pressure (not shown) projects upwardly through the bottom 12c of the cell and discharges air into the impeller 17. Either or both means of introducing air may be employed.

The impeller rotates at a relatively high speed in mixing the air and pulp, and the material in the agitation chamber is in a state of violent turbulence, at all times during operation.

As a consequence, sharp, gritty particles in the pulp bombard exposed surfaces of the impeller 17, cell walls 12, 12a and 12b, and cell bottom 12c.

Likewise, when corrosive materials are under treatment in the cell, the exposed surfaces of the impeller 17, the cell walls 12, 12a and 12b and cell bottom 12c are in substantially constant contact therewith.

The erosion and corrosion resulting from these conditions cause excessive wear on the exposed surfaces. To counteract the rapid deterioration of the cell walls and bottom, rubber lining sections 20, 20a, 20b and 20c are applied to the walls 12, 12a, 12b and bottom 12c respectively of the cell. To prevent excessive wear on the impeller this element embodies a special construction, hereinafter to be described.

While rubber wear-surfaces are not new in the art, considerable difficulty has been experienced in practice in the bonding of rubber to metallic surfaces, and in the lack of sufficient elasticity on the wear surfaces, due to the rigidity of the backing. Likewise, in the production of irregular shaped linings such as are required for the wear-surfaces of impellers, for example, rubber prepared to afford greatest resistance to abrasive action cannot be readily formed in the required shape, or applied to the metallic core.

The present invention involves the use of a stiffened rubber or rubberized fabric as backing and a wear-surface of abrasive-resisting rubber formed integrally therewith.

Figure 9:
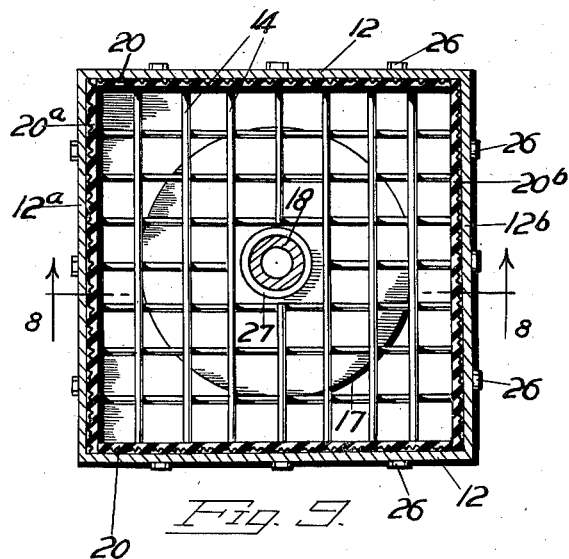
Figure 9 is a section taken along the line 9—9, Figure 8.
Figure 10:
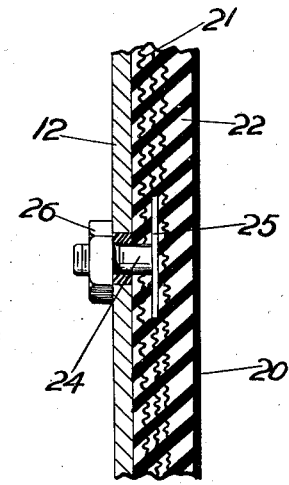
Figure 10 is an enlarged fragmentary section illustrating the means for attaching a lining section to a wall of a flotation cell.

As illustrated in Figures 8, 9 and 10, lining sections 20, 20a, 20b and 20c consist of one or more layers of rubberized fabric 21, and a rubber wear-surface 22 of a composition particularly resistant to abrasive action, formed integrally in the manufacturing process. For this reason, even when particles have worn through the wear-surface 22 there is no peeling or separation of such surface from the fabric backing 21.

The sections are held against the cell walls 12, 12a, 12b and bottom 12c by any convenient means. In the drawings the bottom lining 20c is clamped centrally of the cell by a plate 23 in which the jet 19 is fitted. Additional clamping means are provided in the form of bolts 24 having flattened heads 25 disposed between layers of the fabric during molding of the lining sections. Nuts 26 on the outside of the cell bottom 12c permit the lining section 20c to be drawn tightly against the bottom.

The lining sections 20, 20a and 20b on the upright walls 12, 12a and 12b rest upon the lining 20c of the cell bottom and the abutting surfaces of the lining sections are joined together by a suitable cementing composition.

It is to be understood that the linings for the walls 12, 12a and 12b are clamped in place by a nut and bolt arrangement identical with that hereinbefore described. The wear-surface 22 may be made of a material specially resistant to the corrosive action of any substance which the machine is to treat, when greater deterioration of the lining would normally result from corrosion than from abrasion.

In this connection it is to be understood that while the invention is described in connection with a flotation cell, it may be applied to any device where the same conditions are encountered, such as reagent feeders, conditioners and the like.

The impeller illustrated in Figure 8 is also of a corrosive and abrasive resisting construction. To show the adaptability of this construction in the formation of irregular-shaped devices, an impeller of the type disclosed and claimed in Weinig Patent No. 1,998,694 of April 23, 1935 has been illustrated in Figures 1 to 7 inclusive, as embodying the present invention.

Figure 1:
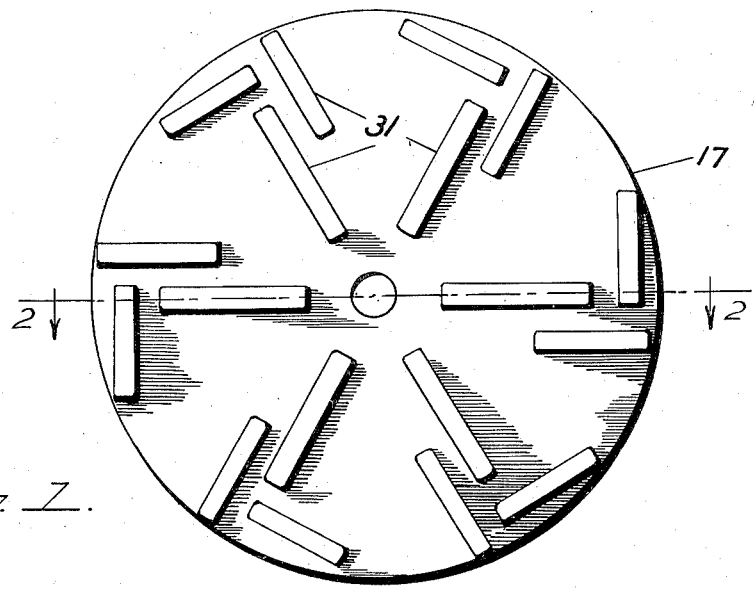
Figure 2:
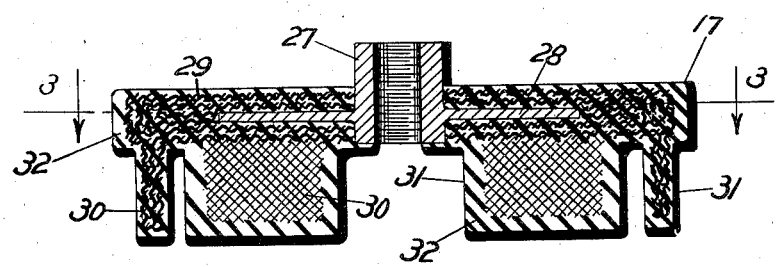
Figure 2 is a section taken along the line 2—2, Figure 1.
Figure 3:
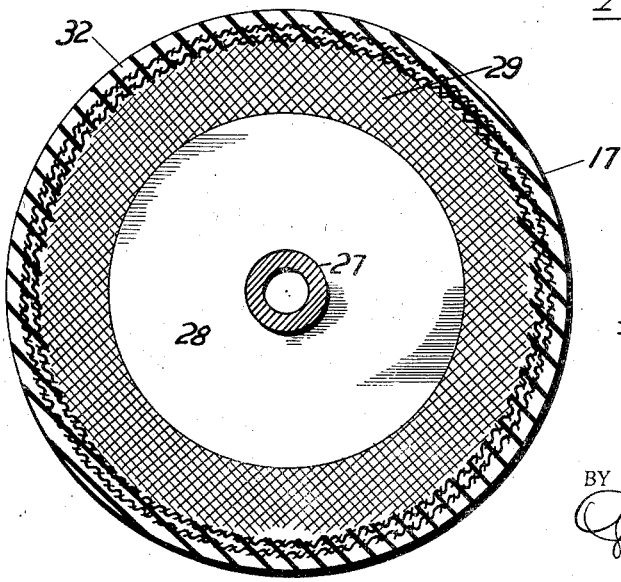
Figure 3 is a section taken along the line 3—3, Figure 2.

Referring first to Figures 1, 2 and 3, the impeller comprises a hollow hub 27, provided with internal threads or other suitable means for attachment to a shaft. The hub carries a laterally extending flange 28, preferably disk shaped. If desired, the top and bottom surfaces of flange 28, which serves as a core, may be corrugated or otherwise roughened to facilitate attachment of the rubber impeller body 17.

The flange is disposed between layers of rubberized fabric 29 extending transversely of hub 27 which are part of a unitary backing element. The element is also provided with projecting layers of rubberized fabric 30, which extend from fabric 29 any desired distance and constitute the backing element of the impeller blades or vanes 31.

The backing element is covered with a layer 32 of rubber of any selective thickness and of a composition particularly resistant to abrasion and corrosion. It is to be understood that any desired arrangement of blades 31 may be employed, and in the drawings the arrangement of the blades in Weinig Patent No. 1,998,694 has been shown, since an impeller of this type is subjected to a large amount of impact, due to the combined pumping, slicing and striking action which it effects.

The backing element and cover layer 32 are formed integrally by any suitable method of rubber manufacture, and the completed impeller 17 possesses wear-resisting properties not heretofore attained in the art, due to the yielding quality of the backing member, and to the improved quality of the rubber cover layer.

It is to be noted that the diameter of flange 28 is considerably less than the diameter of impeller 17. Likewise, the flange 28 is relatively thin, so that very little rigidity and resistance to the impact of particles is afforded thereby.

The modification of the impeller construction illustrated in Figures 4, 5 and 7 differs from the impeller of Figures 2 and 3, principally in the elimination of the disk flange 28, and the substitution in place thereof, of webs 33, preferably extending radially from hub 27 and supporting an annular rim 34 at their outer ends.

The webs 33 and rim 34 are relatively thin and provide little rigidity for the impeller 17, which is freely yieldable to the impact of particles. The rim is disposed adjacent but in spaced relation to the periphery of the impeller 17, and acts as a brace for the blades 31.

In Figure 7 it will be noted that the layers of fabric 29 and 30 are spaced apart with layers of rubber between the same. In some instances it will be desirable to have the fabric layers in close proximity, while in other instances, considerable spacing therebetween will be preferred. The present construction contemplates both arrangements depending on the degree of stiffening desired.

It is also within the contemplation of the invention to omit the rubberized fabric 29 and 30 and in place thereof, to employ a stiffened rubber backing element and a wear-resistant cover layer formed integrally therewith.

The modification contemplated in the last paragraph is preferably accomplished by substituting for the fabric a rubber composition that will harden to a greater extent than the outside rubber layer when vulcanized. In Figure 6 the harder inner layer has been indicated by a different cross-hatching.

The structure illustrated in Figure 6 represents an application of this construction. Projecting flanges 35 on rim 34 and web 33 have the two-fold function of stiffening elements for blades 31 and of preventing movement of the rubber relative to the metal.

Since no satisfactory means of making rubber adhere to metal is known, the flanges 35 are an effective means of holding the rubber against slippage.

From the foregoing, it is apparent that the disk flange 28, the web 33 and rim 34, or the web 33, rim 34 and flanges 35 may be used with any of the rubber constructions shown or described. Likewise, the flanges 35 may be used with the disk flange 28, if desired.

Whatever construction is employed, the impeller element will be yieldable to a greater degree than has heretofore been known in the art. Rubber compositions which could not heretofore be employed in rubber impeller construction can be utilized in the present invention with the result that corrosive and abrasive materials not heretofore treated in froth flotation processes and the like can be economically treated when the present invention is used.

In all the various constructions, it will be noted that a fabricated element is produced from component parts of different degrees of elasticity.

The terms "rubber" and "rubberized" as used in the description and claims are intended to apply to all compositions possessing the same or substantially the same properties as rubber. It is particularly within contemplation of the invention that certain compositions known as "synthetic rubber" but actually not containing rubber, although possessing similar properties, may be used.

Changes and modifications may be availed of within the spirit and scope of the invention, as defined in the hereunto appended claims.

Having described the invention, what is claimed as new is:

1. An impeller of the character described for acting on abrasive pulps, comprising a flanged hub, a rubber body having a stiffened backing element consisting of alternate layers of rubberized fabric and layers of rubber, the flange of the hub being disposed between layers of the fabric, and rubberized vanes projecting from a side of the body.

2. An impeller of the character described for acting on abrasive pulps, comprising a hub, a laterally extending web on the hub, an annular rim at the outer end of the web, a yieldable disk-like body encompassing the web and rim, and yieldable vanes projecting from a side of the body.

3. An impeller of the character described, comprising a flanged hub, a rubber body having a stiffened backing element, the flange on the hub having laterally extending projections at intervals about a side thereof, said flange being disposed within the backing element, and yieldable vanes projecting from a side of the body in the planes of the projections.

GEO. G. MORSE.